United States Patent
Yeh et al.

(10) Patent No.: US 7,639,674 B2
(45) Date of Patent: Dec. 29, 2009

(54) INTERNAL LOAD BALANCING IN A DATA SWITCH USING DISTRIBUTED NETWORK PROCESSING

(75) Inventors: Chiang Yeh, Sierra Madre, CA (US); Dennis Weaver, Spokane, WA (US)

(73) Assignee: Alcatel Lucent, Paris (FR)

( * ) Notice: Subject to any disclaimer, the term of this patent is extended or adjusted under 35 U.S.C. 154(b) by 621 days.

(21) Appl. No.: 10/972,524

(22) Filed: Oct. 25, 2004

(65) Prior Publication Data
US 2006/0101159 A1    May 11, 2006

(51) Int. Cl.
*H04L 12/50* (2006.01)

(52) U.S. Cl. .................. 370/359; 370/229; 370/357; 370/389

(58) Field of Classification Search .......... 370/229, 370/235, 352, 357, 389, 392, 359, 360
See application file for complete search history.

(56) References Cited

U.S. PATENT DOCUMENTS

| | | | |
|---|---|---|---|
| 5,287,537 A | | 2/1994 | Newmark et al. |
| 5,513,355 A | | 4/1996 | Doellinger et al. |
| 5,619,650 A | | 4/1997 | Bach et al. |
| 6,219,692 B1 | | 4/2001 | Stiles |
| 6,650,640 B1 | * | 11/2003 | Muller et al. ............ 370/392 |
| 6,680,933 B1 | * | 1/2004 | Cheesman et al. ......... 370/389 |
| 6,985,438 B1 | * | 1/2006 | Tschudin .................. 370/230 |
| 7,139,271 B1 | * | 11/2006 | Parruck et al. ............. 370/392 |
| 7,177,311 B1 | * | 2/2007 | Hussain et al. ............. 370/392 |
| 2002/0136202 A1 | * | 9/2002 | Droz et al. ................. 370/352 |
| 2003/0074388 A1 | | 4/2003 | Pham et al. |
| 2003/0074473 A1 | * | 4/2003 | Pham et al. ............... 709/246 |
| 2003/0214948 A1 | * | 11/2003 | Jin et al. .................... 370/392 |
| 2003/0231625 A1 | * | 12/2003 | Calvignac et al. ......... 370/389 |
| 2005/0105560 A1 | * | 5/2005 | Mann et al. ................ 370/503 |
| 2005/0213585 A1 | * | 9/2005 | Sturm et al. ........... 370/395.31 |

* cited by examiner

*Primary Examiner*—Kwang B Yao
*Assistant Examiner*—Nguyen Ngo
(74) *Attorney, Agent, or Firm*—RG & Associates LLC (57) ABSTRACT

A data communications switch for dynamically distributing packet processing operations between an ingress and egress processor for load balancing is disclosed. The invention in the preferred embodiment features a switching device including a plurality of switching modules, each of the switching modules including a packet classifier for identifying one or more packet processing operations to be applied to an ingress packet and a controller adapted to allocate each of the identified one or more packet processing operations between a first set of packet processing operations and a second set of packet processing operations, execute the first set of packet processing operations at the ingress processor at which the packet was received, and transmit instructions to the egress processor to execute the second set of packet processing operations. The egress processor then executes the second set of packet processing operations, after which the packet may be transmitted toward its destination node.

18 Claims, 6 Drawing Sheets

INTERNAL LOAD BALANCING IN A DATA SWITCH USING DISTRIBUTED NETWORK PROCESSING

TECHNICAL FIELD

The present invention generally relates to switching device in a data communications network for distributing processing operations and therefore processing load between different packet processing elements. In particular, the invention relates to a system and method for allocating packet processing operations between ingress and egress processors to minimize load imbalances.

BACKGROUND

The distribution of network processing load within a networking device, such as a router or switch, is commonly fixed and largely determined by the architecture of the networking device. Depending on the manufacturer, for example, forwarding decisions and other packet processing is generally predetermined to be performed at either ingress or egress. As a result of the inherent asymmetric processing loads and asymmetric traffic patterns, the network processing load at the ingress point is rarely equal to the network processing load at the egress point in fact, the disparity in processing load between the ingress and egress is often so great that it is common for a processor at one side of the switch to struggle while a processor on the other side of the switch remains nearly idle.

Although some networking devices may share some processing load with other networking devices to balance the processing effort across the available processors, these schemes cannot dynamically balance the packet processing operations because: (a) network processing is typically accomplished by hard-wired application-specific integrated circuit (ASIC) devices, which are very good at repetitive tasks but generally lack the intelligence to alter the distribution of tasks dynamically; (b) network clusters employing distributed processing are designed to handle a set of large and fixed tasks, but are relatively slow and unsuitable for packet processing; and (c) most networking devices are simply over-engineered to accommodate the worst possible load with no consideration given to the excess computing capacity wasted at a system level.

There is therefore a need for a network switching device that can monitor for packet processing load imbalances and dynamically distribute the load between the ingress and egress processors to minimize the imbalance.

SUMMARY

The invention in the preferred embodiment features a switching device including a plurality of switching modules, each of the switching modules including at least one external port adapted to receive a packet or other protocol data unit (PDU); a packet classifier adapted to inspect the packet and identify one or more packet processing operations to apply to the packet based upon one or more packet properties and to identify a second switching module of the plurality of switching modules to which to forward the packet; a controller adapted to allocate each of the identified one or more packet processing operations between a first set of packet processing operations and a second set of packet processing operations, execute the first set of packet processing operations at the switching module including the external port at which the packet was received, and transmit a command to the second switching module instructing the second switching module to execute the second set of packet processing operations. The second switching module is adapted, like each of the plurality of switching modules in the preferred embodiment, to execute the second set of packet processing operations in response to the command, after which the packet may be transmitted to from external port towards its destination node.

In the preferred embodiment, the switching device is a router, bridge, or multi-layer switch while the packet processing operations are packet forwarding operations executed for purposes of preparing the packet for transmission to the next node in the direction of its destination node. In accordance with the preferred embodiment, packet processing operations are capable of being serially-distributed and executed at either an ingress switching module or an egress switching module of the plurality of switching modules. The packet processing operations are generally selected from, but not limited to, the group consisting of: header transformation, tag pushing, tag popping, quality of service, billing and accounting, Multi-Protocol Label Switching (MPLS) management, spanning tree operations, authentication, access control, higher-layer learning, alarm generation, port mirroring, source learning, class of service, color marking, and combinations thereof.

In the preferred embodiment, the method of allocating packet switching operations between a first switching module and a second switching module of a switching device comprises the steps of receiving a packet at an external port of the first switching module; identifying one or more packet processing operations for application to the packet; allocating each of the one or more packet processing operations between a first set of packet processing operations and a second set of packet processing operations; executing the first set of packet processing operations at the first switching module; and transmitting a command to the second switching module to execute the second set of packet processing operations. The method may further include the step of executing the second set of packet processing operations at the second switching module in response to the command.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
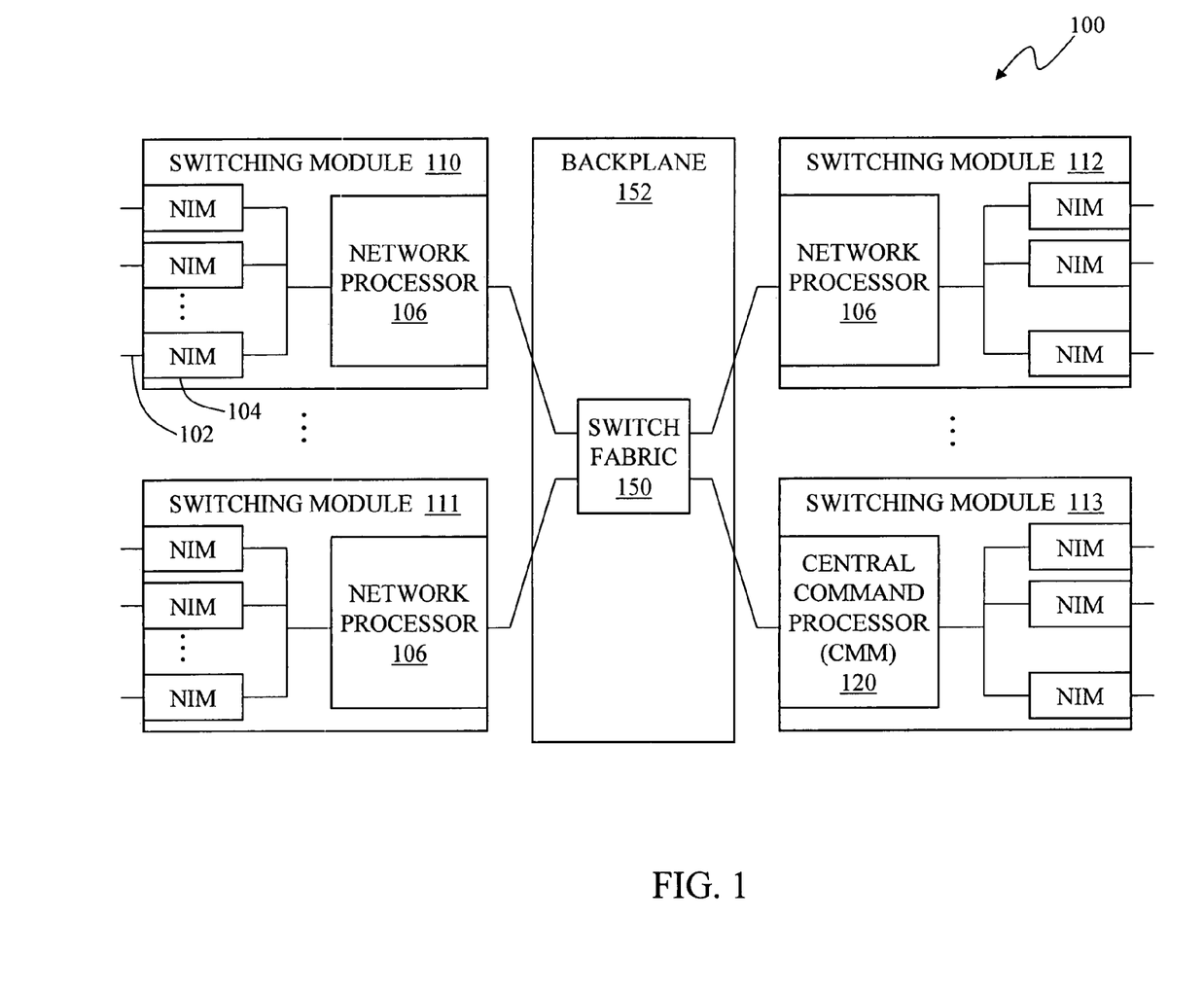
FIG. 1 is a functional block diagram of an enterprise switch, in accordance with the preferred embodiment of the present invention.

Illustrated in FIG. 1 is a functional block diagram of an enterprise switch. The enterprise switch 100 is one of a plurality nodes and other addressable entities operatively coupled to a data communications network embodied in a local area network (LAN), wide area network (WAN), or metropolitan area network (MAN), an Internet Protocol (IP) network, the Internet, or a combination thereof, for example.

The enterprise switch 100 preferably comprises a plurality of switching modules 110-113, sometimes referred to as blades, which are seated into slots in the backplane 152. Each of the switching modules 110-113 includes one or more external ports 102, each of which may be operably coupled to another node in the data communications network via a communications link (not shown), as well at one or more internal ports operably coupling each switching module 110-113 to every other switching module via a shared switch fabric 150.

A switching module 110-113 preferably comprises at least one network processor (NP) 106 capable of, but not limited to, at least Layer 2 (Data Link) and Layer 3 (Network) switching operations as defined in the Open Systems Interconnect (OSI) reference model. One possible Layer 2 protocol for operably coupling the external ports 102 to a wired and/or wireless communications link is the Institute of Electrical and Electronics Engineers (IEEE) 802.3 standard, while the set of possible Layer 3 protocols includes Internet Protocol (IP) version 4 defined in Internet Engineering Task Force (IETF) Request for Comment (RFC) 791 and IP version 6 defined in IETF RFC 1883.

For purposes of this disclosure, data flowing into a switching module 110-113 from an external port 102 toward the fabric 150 is referred to herein as ingress data which comprises ingress PDUs. The switching module through which ingress data propagates is referred to as the ingress switching module. In contrast, data flowing from the fabric 150 to an external port 102 is referred to as egress data which comprises egress PDUs. The switching module through which egress data propagates is referred to as an egress switching module. Each of the plurality of switching modules of the preferred embodiment may serve as both an ingress switching module and an egress switching module for purposes of different flows.

The enterprise switch 100 further includes a central command processor (CMM) 120 for managing various system resources including congestion monitoring and operational assignments discussed in more detail below. In the preferred embodiment, the CMM 120 is embodied in one of the plurality of switching modules 110-113, although one skilled in the art will appreciate that the functions performed by the CMM may be executed by one or more entities incorporated in the backplane 152 and or a separate management module.

Figure 2:
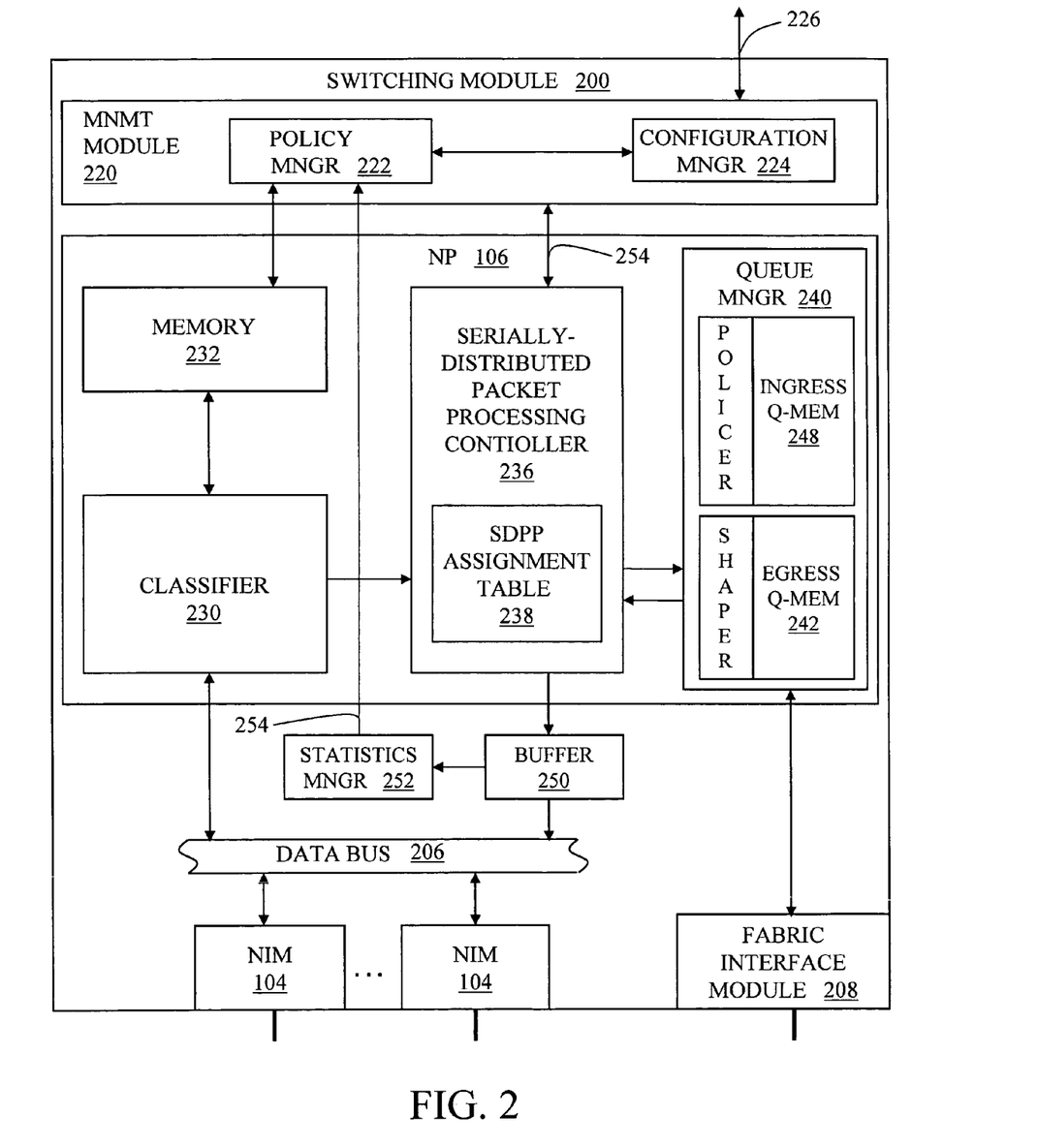
FIG. 2 is a functional block diagram of a switching module of the enterprise switch for performing serially-distributed packet processing, in accordance with the preferred embodiment of the present invention.

Illustrated in FIG. 2 is a functional block diagram of a switching module for performing serially-distributed processing of PDU flows. The switching module 200 of the preferred embodiment, consistent with switching modules 110-113, comprises one or more network interface modules (NIMs) 104, one or more network processors 106, a management module 220, and a fabric interface module 208. Each of the NIMs 104 is operatively coupled to one or more external ports 102 for purposes of receiving ingress data traffic and transmitting egress data traffic. The NIMs 104 preferably include one or more physical interfaces and media access control (MAC) interfaces adapted to exchange PDUs, e.g., Ethernet frames, via network communications links (not shown). Upon receipt, the ingress PDUs are conveyed from the plurality of NIMs 104 to the network processor 106 by means of one or more internal high-speed serial data buses 206. The network processor 106 preferably classifies the ingress PDUs, performs any forwarding operations assigned for execution at ingress, and enqueues the PDUs in ingress queue memory 248 until bandwidth is available to transmit the PDU to the appropriate one or more egress blades via the switching fabric 150.

With respect to egress operations, the switching module 200 is also adapted to receive egress PDUs from the switching fabric 150 and enqueue those PDUs in the egress queue memory 242. The NP 106 of the switching module 200 at egress may perform one or more additional forwarding operations assigned to it before the PDU is committed to one of a plurality of queues in the buffer 250 and transmitted to the appropriate NIM 104 and corresponding egress port 102. The plurality of queues in buffer 250 are actively monitored by a statistics manager 252 which compiles and transmits congestion information 254 to the CMM 120 via the management module 220. The congestion information 254, including queue depth for example, is used to characterize the egress flows, assess the congestion state of the module, and allocate packet processing operations between ingress and egress network processors.

The management module 220 generally comprises a policy manager 222 for retaining and implementing traffic policies uploaded to the switching module 200 by a network administrator via a configuration manager 224. The policies generated by the policy manager 222 are also based in part on Layer 2 and or Layer 3 addressing information derived by source learning operations, which associate PDU address information with the external port 102 on which it was received. As discussed in more detail below, the management module 222 is also adapted to transmit updates 254 from the CMM to the network processor 106 so that that the ingress switching module 200 may execute some, if not all, of the packet processing operations at ingress before transmitting the PDU to one or more downstream switching modules. The updates 254 include the data used to populate the multiplicity of databases supporting the serially-distributed packet processing operations discussed in more detail below.

The NP 106 of the preferred embodiment is adapted to perform Layer 2 switching operations and Layer 3 routing operations using PDU properties associated with Layer 2 through Layer 7 as defined in the OSI network reference model. The NP 106 preferably comprises a classifier 230, a serially-distributed packet processing (SDPP) controller 236, and a queue manager 240. The classifier 230 receives ingress PDUs from the data bus 206, inspects the PDUs for one or more fields of interest, classifies the PDUs into one of a plurality of flows, and retrieves forwarding information from a forwarding table retained in high-speed local memory 232. The forwarding information preferably includes, but is not limited to, a flow identifier and an egress port identifier, i.e., the identifier of external port from which the PDU is to be transmitted.

The forwarding information retrieved by the classifier 230 is transmitted to the SDPP controller 236 where it used to identify a first set of one or more SDPP operations to be performed at ingress. An SDPP operation as used herein refers to a packet processing operation or other forwarding operation that is performed on behalf of a PDU, in response to a PDU, or to facilitate the transmission of a PDU from the switching device 100. The ingress switching module 200 or the CMM 120 may also identify a second set of SDPP operations to be performed at the egress switching module. As one skilled in the art will appreciate, an SDPP operation is susceptible to being executed at either the ingress switching module or the egress switching module. The range of possible SDPP services is discussed in more detail in relation to FIG. 5.

In general, the ingress switching module 200 may perform all, some, or none of the SDPP operations at the ingress switching module. Any SDPP operations executed for the PDU but not performed at the ingress switching module 200 are performed at the egress switching module prior to transmission of the PDU from the switching device 100.

The allocation of SDPP operations between the first set one or more SDPP services applied to ingress and a second set of SDPP services to be performed by the egress switching module is dynamically determined on a per packet and or per flow basis.

Figure 3:
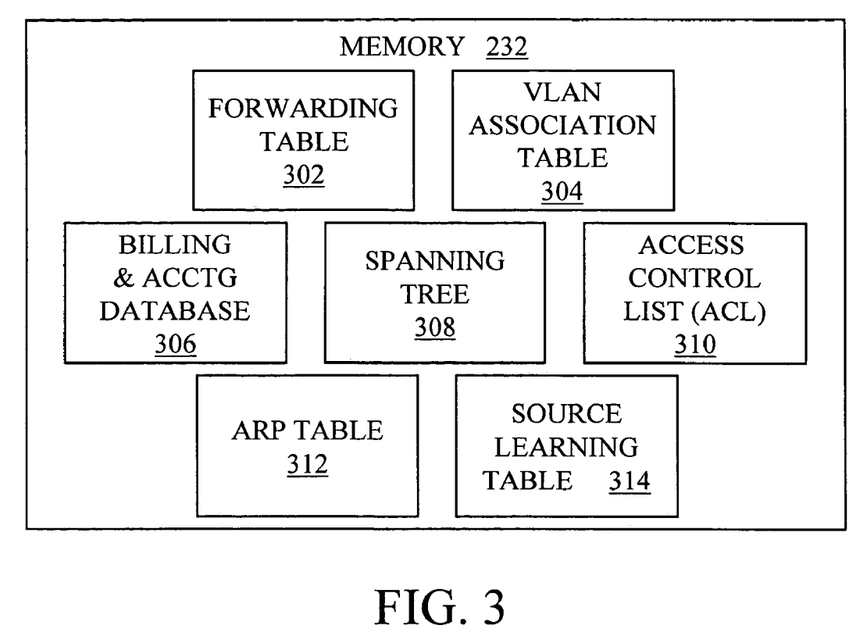
FIG. 3 is a functional block diagram of the databases retained in the local memory of a switching module, in accordance with the preferred embodiment of the present invention.

In the preferred embodiment, the allocation of the SDPP services to be performed at ingress is determined as a function of the flow ID and congestion status of the ingress and egress switching modules. In some embodiments, the congestion status of the ingress and egress switching modules is periodically compiled by the CMM 120 and reported to each switching module so that each of the switching modules may dynamically determine the most beneficial allocation of SDPP services. In other embodiments, the optimum allocation of SDPP operations is determined by the CMM 120, downloaded to each of the plurality of switching modules 110-113, and retained in the in the form of an SDPP assignment table 238 retained in local memory 232, as illustrated in FIG. 3, in conjunction with various shared databases discussed in more detail below.

This SDPP assignment table 238 may, for example, explicitly define the allocation of SDPP services for each pair of ingress and egress switching modules, for example, on a per flow or per packet basis. The SDPP assignment table may be updated at regular intervals, one or more times per second, to reflect changing traffic patterns and inter-blade load imbalances.

The SDPP services are apportioned, in the preferred embodiment, between ingress and egress depending on the relative congestion states of the ingress and egress switching modules. In particular, the SDPP assignments are designed to shift the processing load from the switching module with an over-utilized NP to the module with an under-utilized NP. The goal of the distribution of SDPP services is therefore to uniformly distribute the consumption of processing resources throughout the switching device 100 and thus minimize the probability of any of the switching modules 200 dropping PDUs due to excess traffic conditions. By optimizing the distribution of processing load, the switching device 100 may accommodate disproportionately high traffic conditions that may occur at certain ports, such as the port to which a client attaches or the port providing a gateway to the Internet for example, without the expense of over-engineering all the switching modules.

Figure 4:
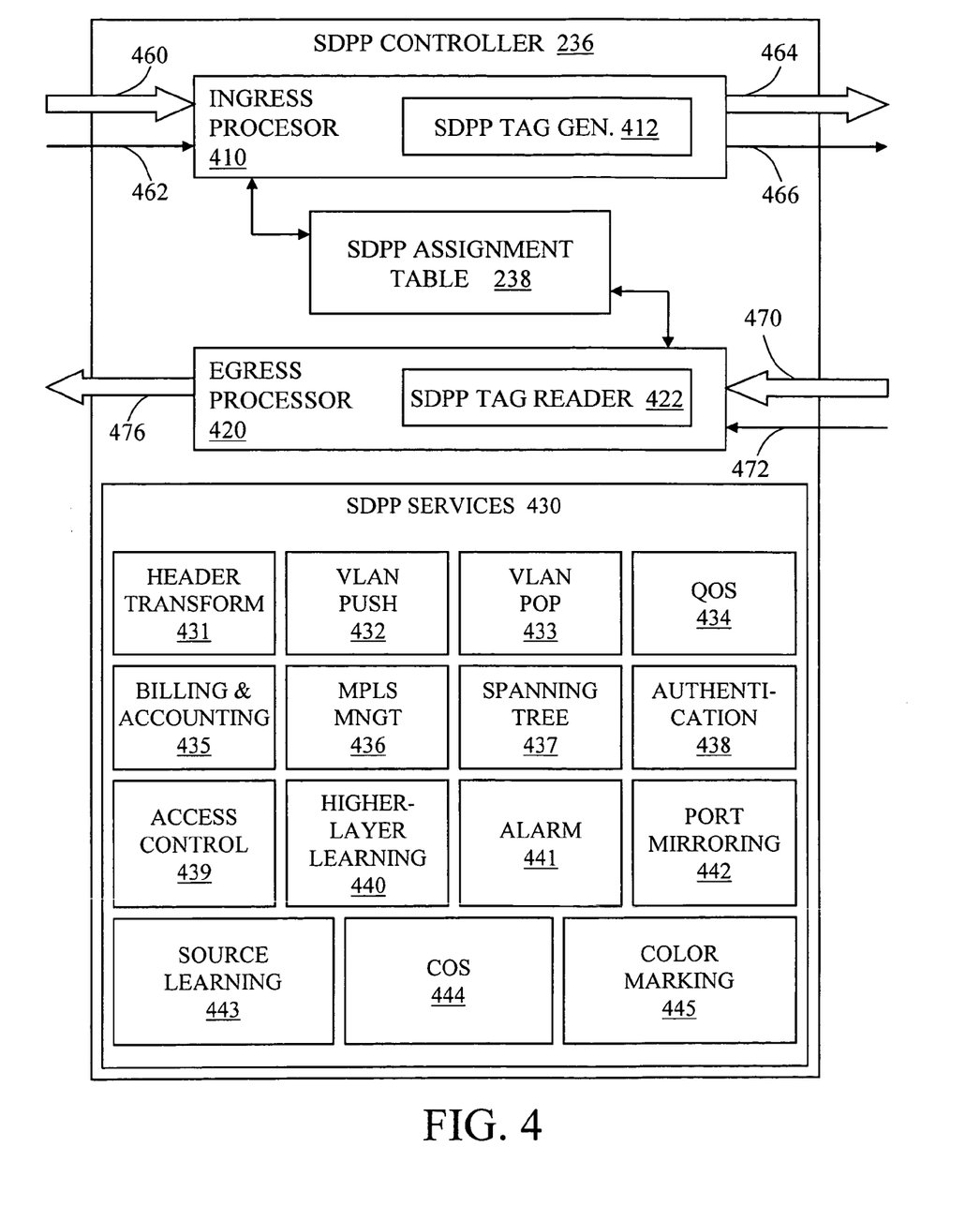
FIG. 4 is a functional block diagram of a serially-distributed packet processing (SDPP) controller, in accordance with the preferred embodiment of the present invention.

Illustrated in FIG. 4 is a functional block diagram of an SDPP controller of the preferred embodiment. The SDPP controller 236 includes an ingress NP processor 410 and egress process 420 embodied in one or more hardware or software computing elements, the SDPP assignment table 238, and one or more modules adapted to execute individual SDPP services 430. The ingress NP processor 410 is adapted to receive the ingress PDU 460 and flow identifier 462 from the classifier 230 and to query the SDPP assignment table 238 for the SDPP service assignment applicable to the individual packet or flow. In the preferred embodiment, the allocation of SDPP service assigned to the ingress and egress switching modules is indicated by an SDPP identifier discussed in detail below. The PDU is subsequently processed at the ingress switching module 200 in accordance with the first set of SDPP services from among the complete selection of SDPP services 430.

The PDU 464 and SDPP identifier 466 are then transmitted to the egress switching module to instruct the egress switching module to execute the second set of SDPP services 430 assigned to the egress switching module. In the preferred embodiment, the SDPP identifier 466 is appended to the PDU or a PDU descriptor by the operations SDPP tag generator 412 prior to its transmission to the switching fabric 150. In other embodiments, the SDPP ID may be transmitted via an out-of-band communication channel, for example.

Upon receipt of a PDU 470, or its descriptor, at the egress switching module, the egress processor 420 of the egress switching module removes the SDPP identifier 472, the SDPP tag reader 422 determines the SDPP services specified by the SDPP identifier by querying the SDPP assignment table 238, and the egress switching module executes the second set of SDPP services 430 needed to complete the forwarding operations necessary to transmit the PDU 476 in the direction of its final destination.

In the preferred embodiment, the listing of SDPP services 430 includes, but is not limited to the following forwarding operations: header transformation, tag pushing, tag popping, quality of service, billing and accounting, Multi-Protocol Label Switching (MPLS) management, spanning tree operations, authentication, access control, higher-layer learning, alarm generation, port mirroring, source learning, class of service, and color marking, and policing and shaping, for example.

Header transformation services 431 generally encompasses the steps of: (a) retrieving a PDU's next-hop address specifying the physical address of the next node in the path to the ultimate destination; (b) encapsulating the PDU with a header including a source address equal to the physical address of the switching device 100, or the egress switching module, as well as a destination address equal to the physical address of the next-hop on the path to the ultimate destination; and (c) decrementing the time-to-live counter of IP packets, for example. The next-hop address may be retrieved from the forwarding table 302 of the local memory 232 (see FIG. 3) of either the ingress or egress switching modules provided the addressing information contained therein is exchanged or the tables regularly synchronized by the CMM 120 for example.

VLAN tag pushing services 432 generally include the steps of (a) identifying one or more VLAN identifiers (VIDs) based on PDU properties including, for example, the PDU source MAC address, destination MAC address, protocol, and ingress port; and (b) encapsulating PDUs with one or more VLAN tags. The appropriate tags may be retrieved from a VLAN association table 304 in local memory 232 (see FIG. 3) used to look-up a VID based upon one or more PDU properties, for example. VLAN tag pushing services may be executed at either the ingress or egress switching modules once the VLAN association table 304, defined by the network administrator for example, is distributed to or otherwise synchronized between each of the plurality of switching modules 110-113 of the switch 100.

VLAN tag popping services 433 include the step of removing one or more VLAN tags from PDUs if the switch 100 is the penultimate hop or as the PDUs transition from a public network to the untagged domain of a private network, for example. As with the VLAN tag pushing services 432 above, the VLAN popping rules embodied in the VLAN association table 304 are distributed between or otherwise shared by the plurality of switching modules 110-113.

Quality of Service (QoS) operations 434 encompass the procedures for reserving network resources, including memory and bandwidth, for example, using a session setup mechanism such as Resource Reservation Protocol (RSVP), for example. QoS operations 434 also encompass the implementation of Integrated Services or Differentiated Services or both. With respect to Differentiated Services, various operations may be executed at either the ingress or egress switching module, these operations including but not limited to priority marking, packet policing, queuing, and scheduling operations. The implementation of Differentiated Service (DiffServ) may also include the identification of the service classes associated with different flows and the assignment of those flows to one of a plurality of tunnels dedicated to transmit the traffic of one of the service classes. The different service class tunnels are preferably MPLS tunnels associated with different IP headers used to encapsulate the PDUs, which may or may not include a preexisting IP header, as the PDUs enter a tunnel. In the preferred embodiment, the PDUs may be assigned to one of a plurality of MPLS tunnels by both the ingress and egress switching modules using procedures prescribed in the DiffServ models including those set forth in Internet Engineering Task Force (IETF) Request for Comment (RFC) 2474 and RFC 2475, both of which are hereby incorporated by reference herein.

Billing and Accounting services 435 preferably include the steps of: (a) identifying customer traffic flows based upon PDU properties; (b) identifying the type or character of services rendered; and (c) generating cumulative charges based upon those services on a per-customer basis and or per flow basis. The identification and tracking of charges can be performed by either the ingress or egress switching modules having access to the local billing and accounting database 306 in memory 232 (see FIG. 3) provided the information is periodically exchanged between the plurality of switching modules or the local billing and accounting databases 306 of the plurality of switching modules 110-113 synchronized by the CMM 120, for example.

MPLS management services 436 preferably include procedures for: (a) exchanging MPLS binding messages with adjacent label-switched routers (LSRs) using session-oriented protocols such as RSVP-related protocols, Session Initiation Protocol (SIP), or Label Distribution Protocol (LDP), for example; (b) determining whether to forward non-MPLS packets into an MPLS domain; (c) determining whether non-MPLS PDUs are members of a Forwarding Equivalency Class (FEC); (d) imposing an MPLS label on those PDUs that are members of a FEC; (e) determine whether the switching module is the penultimate hop for PDUs from the MPLS domain and popping the MPLS labels if necessary; and (f) fragmenting MPLS packets that exceed the maximum byte limitations of the communications links. The data required to manage the implementation of MPLS services—which includes criteria used to determine which FEC of which PDU is a member, the applicable label to apply, and the next-hop address—are centrally maintained by the CMM and distributed to the plurality of switching modules to enable both ingress and egress execution.

Spanning Tree services 437 generally encompass the methods for generating spanning trees needed to break the loops that give rise to broadcast storms. With respect to the network, the enterprise switch 100 is adapted exchange Bridge Protocol Data Units (BPDUs) with other nodes in the network. The BPDUs are used by the enterprise switch 100 to elect a root bridge and determine the shortest distance to the root bridge, for example. The response to the BPDUs of other switches may require that the switching modules of the switch 100 have access to a single shared database or maintain local copies of the shared spanning tree database 308 (FIG. 3) including a list of adjacent bridges and the ports through which they are reachable In the preferred embodiment, the spanning tree is generated by the CMM 120 and periodically downloaded to each of the switching modules 110-113.

Each of the switching modules 110-113 in the preferred embodiment is further adapted to prevent the transmission of BPDUs and broadcast packets between different switching modules, or ports of the switching modules, if doing so would cause broadcast storms. As such, each of the switching modules 110-113 implements a light version of the spanning tree protocol used to identify which of the switching modules are within its broadcast domain and therefore able to receive a transmission without a broadcast storm. After the switching modules within the broadcast domain are identified, the switching module generally duplicates and transmits the BPDU to each of the identified switching modules. In the preferred embodiment, the process of reproducing the BPDUs and transmitting those BPDUs to other switching modules may be delegated from the ingress switching module to the egress switching if the egress switching module is in the same BPDU broadcast domain. A significant factor dictating where the reproduction of the BPDUs should occur is the availability of buffer space at the ingress and egress switching modules.

Authentication services 438 include procedures for determining which PDUs are to be granted admission and the level of access provided upon admission. In the preferred embodiment, each of the switching modules is adapted to consult an access control list (ACL) used to determine whether a received PDU is to be transmitted to its destination address or filtered. The ACL in the preferred embodiment regulates access based upon one or more PDU properties, preferably Layer 2 and Layer 3 properties including the source and destination address, the broadcast bit, the protocol type in order to guard against denial of service attack using Internet Control Message Protocol (ICMP) messages or Internet Group Management Protocol (IGMP) packets—as set forth in RFC 2402, 2463 and 1826—including authentication headers, for example. As above, each of the switching modules 110-113 may maintain an ACL 310 (FIG. 3) including user MAC and or IP addresses, passwords, and associated access privileges.

Access Control services 439 encompasses secondary forms of authentication services which regulate access based upon higher layer properties. In the preferred embodiment, Access Control services 439 pertains to the grant or denial of access based upon: (a) protocol ID, thereby allowing the switching device 100 to counter denial of service attacks using ICMP and IGMP packets, for example, without authentication headers; (b) port number for protocols that uses them including File Transfer Protocol (FTP), Trivial File Transfer Protocol (TFTP), telnet, and instant messaging, for example; and (c) application headers to filter out undesirable applications such as peer to peer file exchanges. In some embodiments, the Access Control services 439 are used to supplement the Authentication services 438 and may be performed at either the ingress or egress switching module anytime after initial authentication services 438 have been performed.

Higher-Layer Learning services 440 include the steps of reporting information learned at a network interface to applications in the switching device 100 concerned with higher-layer operations. MAC addresses learned through Address Resolution Protocol (ARP) messages, for example, are reported to an ARP table 312 retained in local memory 232 (FIG. 3) and periodically updated via exchanges between the plurality of switching modules 110-113 or with the CMM 120.

Alarm services 441 refer to system-wide checks used to notify applications on the switch 100 of conditions that warrant the attention of the CMM 120 or network administrator, for example. These conditions may include, for example, situations in which PDUs having the same source address are received on a plurality of ports.

Port Mirroring services 442 refers to procedures for duplicating PDUs received on one port and transmitting those PDUs to a traffic analysis tool on a designated port by the network administrator, for example.

Source Learning 443 generally refers to the process of: (a) associating a PDU's source address with the ingress port on which it was received; (b) recognizing situations in which PDUs having the same source address are received on different ports; and (c) determining whether to reject a PDU received on one port but previously learned on another or to allow the PDU and simply age-out the previously learned association. The source learning table 314 (FIG. 3) compiled by each of the switching modules 110-113 may be periodically exchanged between the switching modules 110-113 to provide each module access to source learning port associations independent of whether the source learning services 443 were executed at either ingress or egress.

Class of Service (CoS) 444 operations pertain to the procedures for (a) determining, at the ingress or egress switching module, whether a PDU is to be filtered in the preference of another based on one or more criteria including the inbound PDU's IEEE 802.1p priority value, for example, and (b) queuing PDUs of one or more flows at either the ingress or egress switching module and subsequently releasing the PDUs of the application level flows with a scheduler in accordance with the class of service requirements of the flows. The classification criteria used to identify and provision CoS are collectively referred to as classification rules. In the preferred embodiment, the CMM maintains a comprehensive database including the classification rules and the applicable classification data disseminated to the plurality of switching modules 110-113 at periodic intervals or when needed.

Coloring Marking 445 services are used to (a) determine, at the ingress or egress switching module, whether to pass, filter, or re-color PDUs with a tri-color marker previously applied by an upstream node in the network, and (b) implement a token bucket algorithm for appending, at the ingress or egress switching module, a tri-color marker to the PDUs to assist downstream nodes in selectively filtering the packets as needed. Coloring Marking 445 services encompasses both Two Rate Tri-Color Marker (trTCM) and currently embodied in an IETF publication authored by Osama Aboul Magd, and includes Single Rate Tri-Color Marker (srTCM) in an IETF publication drafted by Juha Heinanen, both of which are hereby incorporated by reference herein.

Figure 5:
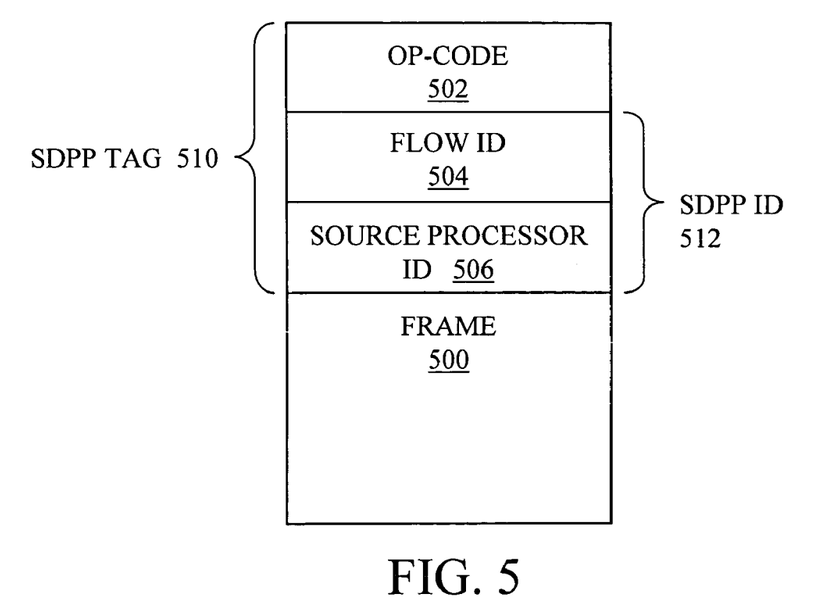
FIG. 5 is a schematic diagram of a header for distributing SDPP services between switching modules, in accordance with the preferred embodiment of the present invention.

Illustrated in FIG. 5 is a schematic diagram of an SDPP tag for transmitting packet data between switching modules. The SDPP tag 510 in the preferred embodiment is appended to a PDU 500 or PDU descriptor by the SDPP tag generator 412 of the ingress switching module 200 and read by the SDPP tag reader 422 of the egress switching module. The SDPP tag 510 in the preferred embodiment comprises an SDPP identifier (ID) 512 and an op-code 502.

As discussed above, the SDPP ID 512 serves as a command used to instruct the egress switching module that receives the PDU to perform one or more forwarding operations on behalf of the ingress switching module. In other words, the SDPP tag in the preferred embodiment provides the signaling mechanism by which an ingress processor serially-distributes one or more PDU forwarding operations to an egress processor, thereby reducing the processing load experienced by the ingress processor. In the preferred embodiment, the SDPP ID 512 is retrieved at ingress from the SDPP assignment table 238, although it may also be determined dynamically as a function of the processing load in one or more switching modules 110-113.

In some embodiments, the SDPP ID 512 comprises a flow ID 504 and a source processor ID 506. The flow ID 504 uniquely defines a stream of one or more PDUs having the same SDPP service processing requirements, while the source processor ID 506 indicates the NP 106 of the ingress switching device 200 from which the PDU was received. The switch 100 may use the flow ID 504 and source processor ID 506 together to uniquely define the particular SDPP services to apply to or execute on behalf of the associated PDU 500.

The SDPP tag 510 in some embodiments further comprises an operations code, i.e., op-code 502. The term op-code as used herein refers to a command that causes an egress switching module to be configured to execute the forwarding operations specified by the SDPP ID of one or more PDU flows associated with the op-code. Upon receipt of an op-code, the egress NP loads one or more computer readable instructions to the NP's on-chip cache (not shown) or other local memory 232. Since the on-chip cache of most NPs is too small to retain the computer readable instructions needed to process every possible flow seen by the switch 100, the op-code 502 is used to load only those programmatic instructions needed to execute the SDPP services for the limited number of flows transmitted to the particular egress NP which is a subset of flows supported by the switch 100. As such, different instruction sets maybe uploaded to the NP of different switching modules 110-113 to optimize the forwarding operations at each of the particular NPs 106. The instructions sets of the individual NPs 106 may also be updated at-will as traffic changes by merely issuing a new op-code.

By way of example, an op-code may be issued by an ingress switching module instructing the egress NP 106 to cache all executable codes or algorithms necessary to processing one or more flows in accordance with an MPLS protocol. Once the executable codes associated with the particular op-code 502 are cached, each of the subsequent PDUs having a flow ID 404 specifying an MPLS processing operation may be subjected to the same processing regime until a new op-code is received.

The switching modules 110-113 of the switch 100 in some embodiments are adapted to collectively process batches of packets, i.e., a plurality of packets associated with one or more PDU flows. To execute batch processing, a SDPP tag 510 including an op-code 502 and SDPP ID 512 is transmitted with the first packet of a plurality of related packets. Thereafter, the SDPP tag 510 applied to the related packets need only include the SDPP ID 512. The egress switching module then subjects each of the plurality of PDUs to the processing regime specified by its SDPP ID 510 and the computer readable instructions specified in the first of the plurality of PDUs. In this manner, the need to transmit the op-code 502 with each of the plurality of PDUs is obviated and the resources needed to append, transmit, and read the op-code 502 is reduced.

In an alternative embodiment, the SDPP ID 512 and or op-code 502 are transmitted from the ingress switching module to the egress switching module using an out-of-band communication channel (not shown). The out-of-band communication channel corresponds to a signaling channel, e.g. a bus, different from the data channels used to transmit PDUs between switching modules.

Figure 6:
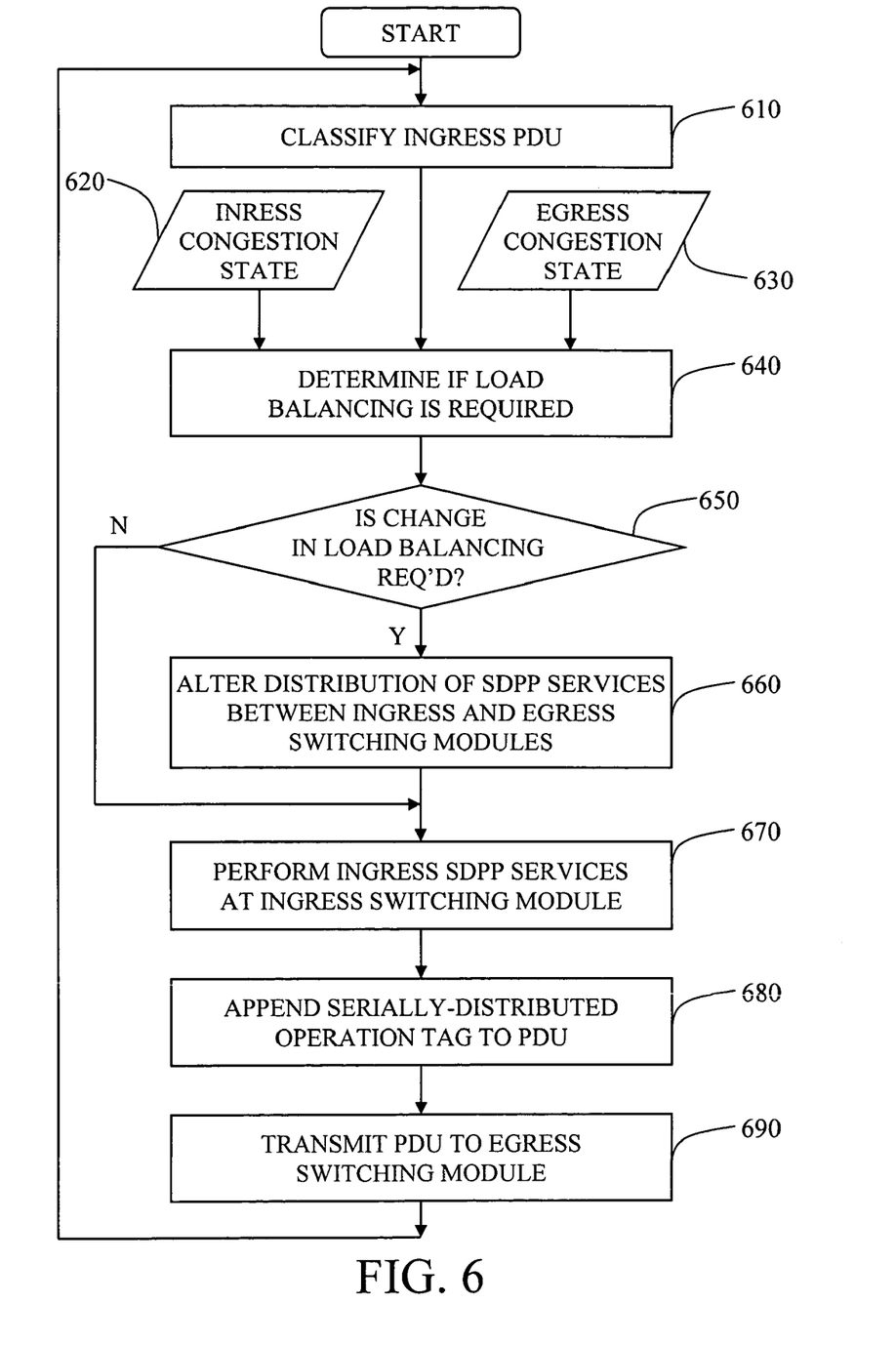
FIG. 6 is a flowchart of the method by which an ingress switching module processes an ingress flow, in accordance with the preferred embodiment of the present invention.

Illustrated in FIG. 6 is a flowchart of the method by which an ingress switching module processes an ingress flow. Upon receipt of an ingress PDU (step 610), the ingress switching module in the preferred embodiment classifies the PDU to identify the egress switching module to which it will be transmitted. Knowing the egress switching module, the ingress switching module can determine (step 640) the relative demands placed on the ingress and egress switching modules and the need for load balancing. The PDU processing load experienced by the ingress switching modules (step 620) and egress switching module (step 630) may be acquired, in some embodiments, by the CMM 120 from the congestion states of the modules themselves. If the congestion state of the ingress switching module is over-utilized relative to the egress switching module, the load balancing change inquiry (testing step 650) is answered in the affirmative and the distribution of SDPP services performed between ingress and egress altered (step 660) to reduce the load imbalance. If the ingress switching module is relatively overloaded, for example, the percentage of the total SDPP services allocated to the egress switching module may be increased in proportional to the degree of imbalance. In the case of a severely overloaded ingress switching module, all the SDPP services may be allocated to the egress switching module. If the load experienced by the ingress and egress switching modules are substantially equal and the different within a predetermined load differential threshold, the load balancing change inquiry (testing step 650) is answered in the negative and the pre-existing distribution of SDPP services is maintained.

After the allocation of SDPP services has been determined, the ingress switching module executes (step 670) the subset of SDPP services designated for ingress. The remaining SDPP services to be executed at egress are specified in the one or more fields of the SDPP tag appended (step 680) to the PDU prior to the transmission (step 690) of the PDU to the egress switching module. If the egress switching module is severely congested due to other traffic conditions, for example, the ingress switching module may perform all SDPP services required by the PDU and the SDPP ID appended to the packet have a null value indicating the absence of any SDPP processing at the egress switching module.

Figure 7:
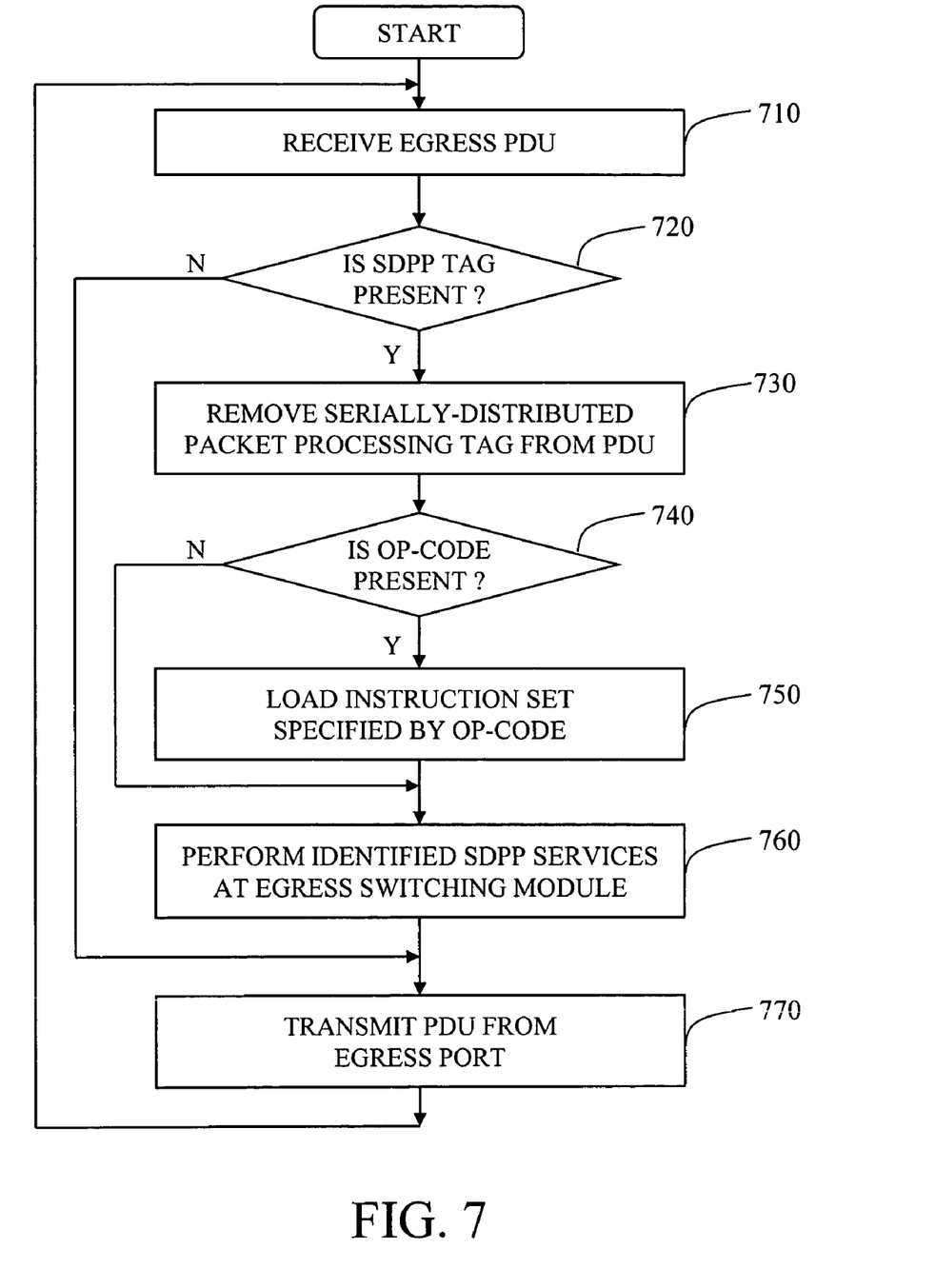
FIG. 7 is a flowchart of the method by which an egress switching module processes an egress flow, in accordance with the preferred embodiment of the present invention.

Illustrated in FIG. 7 is a flowchart of the method by which an egress switching module processes an egress flow. Upon receipt (step 710) of a PDU from the switching fabric 150, the module inspects the PDU for the presence of an SDPP tag 510 and reads the fields contained therein. If the SDPP tag 510 is present, the SDPP tag inquiry (testing step 720) is answered in the affirmative and the SDPP tag removed (step 730) for inspection. If the SDPP tag includes an op-code 502, the op-code inquiry (step 740) is answered in the affirmative and the computer readable instructions indicated by the op-code loaded (step 750) into cache in the egress network processor. In the absence of an op-code within the SDPP tag, the op-code inquiry (step 730) is answered in the negative and the NP 106 executes (step 760) the second set of SDPP services identified by the SDPP ID 512 in accordance with the instruction set specified by the op-code of a preceding PDU of the same batch. The PDUs processed in accordance with the SDPP service requirements are then transmitted (step 770) from the egress switching module in the direction of the PDU's destination node. As one skilled in the art will appreciate, the PDUs processed at a egress network processor undergo the same packet processing and appear substantially identical to PDUs processed at either the ingress or egress switching module alone.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A switching device comprising a plurality of switching modules, each of the switching modules comprising:
   at least one external port adapted to receive a protocol data unit (PDU);
   a classifier communicably coupled to a controller, the classifier adapted to identify:
      one or more PDU processing operations for application to the PDU; and
      a second switching module of the plurality of switching modules to which to forward the packet, including a flow identifier and an egress port identifier, to the controller to identify a first set of one or more packet processing operations to be performed at an ingress port, based on forwarding information related to a tag, appended to the PDU, that includes an identifier of the PDU and an operations code of the PDU, the identifier used to instruct the second switching module to perform one or more dynamic, load balancing forwarding operations on behalf of a first switching module, the operations code related to a command that causes the second switching module to be configured to execute the forwarding operations specified by the identifier of the PDU associated with the operations code; and
   the controller adapted to:
      allocate each of the one or more PDU processing operations between a first set of PDU processing operations and a second set of PDU processing operations;
      execute the first set of PDU processing operations upon receipt of the PDU from the external port; and
      transmit a command to execute the second set of PDU processing operations to the second switching module, wherein the allocation of PDU processing operations between the first set of PDU processing operations and the second set of PDU processing operations is determined as a function of a flow identifier and a pre-determined congestion status of the second switching module and the first switching module.

2. The switching device of claim 1, wherein each of the switching modules is further adapted to execute the second set of PDU processing operations in response to the command from one of the plurality of switching modules.

3. The switching device of claim 2, wherein each of the switching modules is further adapted to transmit the PDU to the switching module to which the command is transmitted.

4. The switching device of claim 1, wherein the PDU processing operations comprises PDU forwarding operations.

5. The switching device of claim 1, wherein the PDU processing operations are selected from a group consisting of: header transformation, tag pushing, tag popping, quality of service, billing and accounting, Multi-Protocol Label Switching (MPLS) management, spanning tree operations, authentication, access control, higher-layer learning, alarm generation, port mirroring, source learning, class of service, coloring marking, and combinations thereof.

6. The switching device of claim 5, wherein the PDU processing operations are operations capable of being serially-distributed and executed at either an ingress switching module and an egress switching module of the plurality of switching modules.

7. The switching device of claim 1, wherein the command is an identifier indicating the allocation of one or more PDU processing operations between the first set of PDU processing operations and the second set of PDU processing operations.

8. The switching device of claim 7, wherein a header comprising the identifier is appended to the PDU for transmission from the switching module for executing the first set of PDU processing operations to the switching module for executing the second set of PDU processing operations.

9. The switching device of claim 8, wherein the header further includes an operations code causing the switching module for executing execute the second set of PDU processing operations to load one or more computer readable instructions to execute the second set of PDU processing operations.

10. The switching device of claim 1, wherein the switching device further comprises a switching fabric for transmitting the PDU from the switching module for executing the first set of PDU processing operations to the switching module for executing execute the second set of PDU processing operations.

11. The switching device of claim 1, wherein each of the switching modules further includes an assignment table to allocate each of the one or more PDU processing operations between the first set of PDU processing operations and the second set of PDU processing operations.

12. The switching device of claim 1, wherein the allocation of each of the one or more PDU processing operations between the first set and the second set reduces a relative processing load imbalance between the switching modules for executing the first set and the switching module for executing the second set.

13. A method of allocating protocol data unit (PDU) switching operations in a switching device comprising a first switching module and a second switching module, the method comprising the steps of:
  receiving a PDU at an external port of the first switching module;
  identifying one or more PDU processing operations for application to the PDU;
  forwarding a packet, including a flow identifier and an egress port identifier, to a controller, the controller communicably coupled to a classifier, to identify a first set of one or more packet processing operations to be performed at an ingress port, based on forwarding information related to a tag, appended to the PDU, that includes an identifier of the PDU and an operations code of the PDU, the identifier used to instruct the second switching module to perform one or more dynamic, load balancing forwarding operations on behalf of a first switching module, the operations code related to a command that causes the second switching module to be configured to execute the forwarding operations specified by the identifier of the PDU associated with the operations code;
  allocating each of the one or more PDU processing operations between a first set of PDU processing operations and a second set of PDU processing operations, wherein the allocation of PDU processing operations between the first set of PDU processing operations and the second set of PDU processing operations is determined as a function of a flow identifier and a pre-determined congestion status of the first switching module and second switching module;
  executing the first set of PDU processing operations at the first switching module; and
  transmitting a command to the second switching module to execute the second set of PDU processing operations.

14. The method of claim 13, wherein the method further comprises the step of executing the second set of PDU processing operations at the second switching module in response to the command from the first of switching modules.

15. The method of claim 13, wherein the method further comprises the step of transmitting the PDU to the second switching module.

16. The method of claim 13, wherein the method further comprises the step of appending a header comprising an identifier to the PDU transmitted from the first switching module to the second switching module, the identifier indicating the allocation of the one or more PDU processing operations between the first switching module and the second switching module.

17. The method of claim 13, wherein the method further comprises the step of retrieving the identifier from an assignment table that allocates each of the one or more PDU processing operations between the first switching module and the second switching module.

18. A switching device comprising:
  a first switching module comprising:
    at least one external port adapted to receive a protocol data unit (PDU);
    a classifier communicably coupled to a controller, the classifier adapted to identify:
      one or more PDU processing operations for application to the PDU; and
      a second switching module to which to forward a packet, including a flow identifier and an egress port identifier, to the controller to identify a first set of one or more packet processing operations to be performed at an ingress port based on forwarding information related to a tag, appended to the PDU, that includes an identifier of the PDU and an operations code of the PDU, the identifier used to instruct the second switching module to perform one or more dynamic, load balancing forwarding operations on behalf of a first switching module, the operations code related to a command that causes the second switching module to be configured to execute the forwarding operations specified by the identifier of the PDU associated with the operations code;
    the controller adapted to:
      allocate each of the one or more PDU processing operations between a first set of PDU processing operations and a second set of PDU processing operations, wherein the allocation of PDU processing operations between the first set of PDU processing operations and the second set of PDU processing operations is determined as a function of a flow identifier and a pre-determined congestion status of the second switching module and the first switching module;
      execute the first set of PDU processing operations; and generate a command to execute the second set of PDU processing operations;

a switch fabric; and the second switching module operatively coupled to the first switching module via the switch fabric, the second switching module comprising:

a controller adapted to execute the second set of PDU processing operations in response to the command; and at least one external port adapted to transmit the PDU.

* * * * *

UNITED STATES PATENT AND TRADEMARK OFFICE
CERTIFICATE OF CORRECTION

PATENT NO. : 7,639,674 B2  Page 1 of 1
APPLICATION NO. : 10/972524
DATED : December 29, 2009
INVENTOR(S) : Yeh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 855 days.

Signed and Sealed this

Twenty-first Day of December, 2010

David J. Kappos
*Director of the United States Patent and Trademark Office*